United States Patent [19]

Clark

[11] Patent Number: 5,300,129
[45] Date of Patent: Apr. 5, 1994

[54] COATING FOR IMPROVED RETENTION OF CBN IN VITREOUS BOND MATRICES

[75] Inventor: Thomas J. Clark, Powell, Ohio

[73] Assignee: General Electric Company, Worthington, Ohio

[21] Appl. No.: 5,951

[22] Filed: Jan. 19, 1993

[51] Int. Cl.$^5$ .............................................. B24B 1/00
[52] U.S. Cl. ........................................ 51/295; 51/293; 51/298; 51/308; 501/65
[58] Field of Search ................ 51/293, 295, 298, 308; 501/65

[56] References Cited

U.S. PATENT DOCUMENTS

| | | | |
|---|---|---|---|
| 4,951,427 | 8/1990 | St. Pierre | 51/293 |
| 5,104,422 | 4/1992 | St. Pierre | 51/295 |
| 5,143,523 | 9/1992 | Matarrese | 51/295 |

FOREIGN PATENT DOCUMENTS 1266972 3/1972 United Kingdom .

OTHER PUBLICATIONS

U.S. Ser. No. 07/741,896, filed Aug. 8, 1991, St. Pierre.

*Primary Examiner*—Mark L. Bell
*Assistant Examiner*—Willie J. Thompson

[57] ABSTRACT

The invention is directed to cubic boron nitride (CBN) particles coated with a thin inner layer formed by the reaction of a reactive glass or ceramic to form a chemical bond and, optionally, an outer layer of a vitreous material. The particles are useful as abrasive particles in a vitreous bonding matrix. In addition, a method of preparing the particles and abrasive tools containing the particles are encompassed.

19 Claims, No Drawings

COATING FOR IMPROVED RETENTION OF CBN IN VITREOUS BOND MATRICES

The invention relates to abrasive cubic boron nitride (CBN) particles having vitreous coating layers the inner layer being a thin layer formed by reacting the CBN particles with a glass or ceramic which is reactive with the CBN particles to form a chemical bond between the CBN particles and the inner layer and the outer layer being a conventional vitreous material. The present invention is also directed to tools, particularly grinding wheels, containing these abrasive particles, particularly in a vitreous bonding matrix.

BACKGROUND OF THE INVENTION

Cubic boron nitride (CBN) is a crystalline material prepared by subjecting pyrolytic or hexagonal boron nitride to high temperatures and pressures to transform the crystalline structure to a more highly ordered structure having improved hardness and thermal properties among other differing properties. CBN crystal particles and other materials, such as diamond and silicon carbide particles, are known in the art to be useful as abrasive materials because of their hardness and thermal properties. These particles are particularly useful when they are distributed in a bonding matrix and the system containing the matrix with the abrasive particles is used as an abrasive component in a tool. The abrasive particles are dispersed in the bonding matrix which is then fired or hardened by known methods to securely retain the particles throughout the matrix. One of the desired characteristics of the abrasive particle-containing matrix systems is good retention of the particles in the matrix in order that the abrasive particles are held in a working contact position during use. Such matrices containing abrasive particles are particularly useful as the abrasive component in tools used, for example, for grinding, polishing or machining hard materials, such as metals or ceramics. For instance, the matrix-abrasive particles systems can be used to make grinding wheels.

One type of bonding matrix which has found great utility is a vitreous, i.e. a glass based, bonding matrix. These matrices exhibit the good wear resistance and thermal stability necessary for the matrix systems. Unfortunately, some problems have been encountered in the art when trying to use CBN particles in vitreous bonding matrices. The vitreous bonding matrices which are useful in these systems are reactive with CBN and generally contain alkali metal oxides which are also reactive with CBN. The reactiveness of the matrix with CBN is detrimental to the system in that an excessive amount of nitrogenous gas by-product, or ammonia if water is present, is given off under sintering or use conditions which causes bloating at the interface of the matrix and the CBN particle. These phenomena lead to bloating and slumping, i.e. loss of shape, of the desired matrix form. Such form inconsistencies caused by bloating are detrimental to the use of the matrix in abrasive tools, for example, grinding wheels may lose their shape due to bloating.

Consequently, the art has turned to the practice of coating CBN particles with metals or metal oxides or organic materials when using them in a vitreous bonding matrix, as in U.S. Pat. No. 4,951,427 and the patents discussed therein. Such "barrier" coatings are employed in order to prevent the reaction of CBN with the matrix. However, CBN particles coated with a metal, metal oxide or organic compound provide only physical bonding between the CBN particle and the coating and between the coating and the matrix.

Better retention of the CBN in the matrix would be very desirable and would provide better abrasive components. Particularly, it would be desirable to have an abrasive system wherein the CBN particles were chemically bonded to the matrix. It is well known in the art that chemical bonds provide a much stronger bonding force than mere physical bonding. However, the problem of bloating when using chemically reactive coatings has turned the art away from the possibility of chemically bonded CBN.

SUMMARY OF THE INVENTION

It is an object of the invention to provide an abrasive particle comprising CBN wherein the CBN is chemically bonded in order to provide good retention of the particle in the matrix. This object is achieved by coated abrasive CBN particles having a thin inner coating, formed by the reaction of a reactive glass or ceramic material with the CBN particle, chemically bonded to the CBN and an outer coating of a vitreous material compatible with a vitreous bonding matrix. The inner coating provides a chemical bond to the CBN particle which greatly improves retention of the particle in a vitreous matrix. Also, prereacting the glass and CBN allows gases to escape which otherwise may cause bloating during sintering or use. The outer coating gives the coated particle compatibility with the vitreous matrix. The inventors have discovered that a thin inner coating can provide a chemical reaction of sufficient degree to provide a strong chemical bond to the CBN but limited enough to avoid bloating caused by excess release of nitrogenous by-products.

The invention is also directed to coated CBN particles having just the above-described inner coating.

Another object of the invention is to provide apparatus for the grinding and shaping of hard materials, such as, for example, grinding wheels containing the above-described coated particles in a vitreous bonding matrix.

A further object of the invention is to provide a method for preparation of the coated particles.

Upon further study of the specification and appended claims, further objects and advantages of this invention will become apparent to those skilled in the art.

DESCRIPTION OF THE INVENTION

In attempting to provide CBN particles which are strongly bonded to the vitreous bonding matrix in which they are used, two major problems are encountered. First, the glasses and ceramics which are reactive with CBN to form a strong chemical bond do not usually have the wear resistance or thermal stability necessary to provide an adequate bonding matrix system. Second, the glasses and ceramics which are reactive with CBN are generally highly reactive to the extent that, when uncontrolled, their reaction causes the release of excess amounts of nitrogenous by-products which can bloat the bond and prevent proper fabrication of an abrasive particle and bonding matrix system.

The inventors have solved these two problems and provided a coated CBN particle which is chemically bonded to the matrix system to provide excellent retention and which does not have excess bloating. This result has been achieved by a CBN particle having a coating wherein the inner layer is a thin layer formed by the reaction of a glass or ceramic which is reactive with CBN and the outer layer is a vitreous material which can be made soluble with the inner layer at their interface. Also, the inner and outer layers can be made compatible by the use of intermediate layers therebetween. It has been discovered by the inventors that this coating allows a reaction between the inner layer and the CBN with the formation of a wetted chemical bond between CBN and the glass or ceramic but limits the degree of the reaction to a level which allows gaseous by-products to escape so that they are not generated during sintering or use, which could cause detrimental bloating of the bond. The result is a CBN particle which is chemically bonded to the coating, thus, having good retention when used in a vitreous matrix, and which also has good wear resistance and thermal properties provided by the outer layer of a vitreous material. The coating layers should also provide a graded seal of thermal expansion coefficients from the CBN particle to the matrix, in order to prevent cracking at layer interfaces.

Any conventional CBN particles may be used in the invention. CBN particles of various sizes are available from the General Electric Company. When used in preparing grinding wheels, particles having a size range of from 60/80 mesh to 325/400 mesh are preferred.

The inner layer is formed from a glass or ceramic which is reactive with CBN. It is preferred to use glasses or ceramics which form a boron oxide or silicate on the CBN. Examples of glasses or ceramics which may be used as the inner layer are borate glasses, such as Pyrex or Pyrex-like materials. The layer must be thin enough to limit the amount of bloating of the bond to acceptable levels and be of sufficient thickness to provide a strong chemical bond and a graded seal between the CBN and the matrix. Preferably, the layer formed has a thickness of up to 10 microns, particularly preferably from 5 to 10 microns.

The outer layer is a vitreous material which has good compatibility with vitreous bonding matrix materials and which can be made soluble with the inner layer at their interface and also be made soluble with the bonding matrix at their interface. The outer coating also has wear resistance and thermal stability suitable for use in vitreous bonding matrix systems. The outer layer may be composed of vitreous bonding matrix materials. It is preferred, when the particles are to be used in a vitreous bonding matrix that the outer layer is composed of the same vitreous bonding matrix material. Any materials useful for a vitreous bonding matrix having the above-described properties may be used for the outer coating. It is desired that they have high softening points and good abrasion resistance. Preferably, the outer layer is formed with a thickness of up to 50 microns, particularly preferably from 25 to 50 microns.

The outer layer and inner layer must be capable of being made soluble in each other at their interface under the final bonding conditions or at some prior time under differing conditions. Alternatively, the layers can be made soluble before final bonding. Also, intermediate layers between the inner and outer layer can be provided.

In another embodiment of the invention there is provided CBN particles which have only the inner coating as described above. In this embodiment, it is necessary that the inner layer be capable of being made miscible with the vitreous matrix and must form a graded seal between the CBN and the matrix.

The inner and outer coatings can be formed on the CBN particle by levitating the CBN particles in a stream of warm air while a slurry containing the reactive glass frit is sprayed onto the particles. As the liquid evaporates, the inner layer of the coating is formed on the CBN surface. The coated particle can then be sintered and treated to cause the reaction between the reactive glass coating and the CBN. Because of the prereaction with the thin inner layer, the nitrogenous gas products evolved during sintering of use are kept at a minimum and excessive bloating does not occur. Subsequently, if the particle has a further coating, the particle is subjected to another slurry spray with the vitreous material used for that coating. The method of applying the coating is similar to that described in Matarrese (U.S. Pat. No. 5,143,523) the disclosure of which is incorporated herein by reference. Other methods which are useful for applying a thin layer of glass or ceramic and then a layer of vitreous material can also be used.

The coated CBN particles are preferably used in a vitreous bonding matrix to form an abrasive component useful as a surface for abrading hard materials, such as, metals, stone or ceramics. Particularly, the particles are useful in a vitreous bonding matrix for preparing grinding wheels. The coated particles are dispersed in the vitreous bonding matrix in any conventional manner for distributing particles in a bonding matrix. The matrix containing the particles is then fired to harden the matrix and the particles are retained embedded in the matrix.

Alternatively, the coated particles may be used directly, without the addition of a bonding matrix, to form an abrasive component. This is possible if the outer coating of vitreous material is sufficiently thick that the final concentration of CBN particles in the vitreous material is acceptable for the use of the abrasive component. In this alternative, the coated particles are fired together such that they agglomerate into a continuous material with the CBN particles distributed therein.

Vitreous bonding matrices containing the coated particles may also contain other abrasive particles known in the art. Further, the vitreous bonding matrix may contain other matrix materials, such as metal bonding and resin bonding materials, which are compatible with the system.

The abrasive component containing the duplex coated CBN particles may be used as the abrasive component in tools used to abrade hard surfaces. For example, the abrasive component can be prepared in the form of a grinding wheel. Such CBN particle containing vitreous bonded grinding wheels are very effective for high removal rates of steel in precision and form grinding.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An abrasive coated particle comprising a cubic boron nitride particle coated with a thin inner layer formed by the chemical reaction of the cubic boron nitride with a borate glass and an outer layer of a vitreous material.

2. The abrasive coated particle of claim 1, wherein a graded seal is formed in the coated particle.

3. The abrasive coated particle of claim 1, wherein the inner layer is formed in an amount sufficient to prevent bloating caused by the generation of gases during sintering or use of the particle.

4. The abrasive coated particle of claim 1, wherein the inner layer has a thickness of up to 10 microns.

5. The abrasive coated particle of claim 1, wherein the inner layer has a thickness of from 5 to 10 microns.

6. The abrasive coated particle of claim 1, wherein the outer coating comprises a vitreous bonding matrix material.

7. The abrasive coated particle of claim 1, wherein the outer coating has a thickness of up to 50 microns.

8. The abrasive coated particle of claim 1, wherein the outer coating has a thickness of from 25 to 50 microns.

9. A tool comprising an abrasive component wherein said abrasive component comprises abrasive particles, embedded in a vitreous bonding matrix, said abrasive particles comprising a cubic boron nitride particle coated with a thin inner layer formed by the chemical reaction of the cubic boron nitride with a borate glass and coated with an outer layer of a vitreous material.

10. The tool of claim 9, wherein said tool is a grinding wheel.

11. The tool of claim 9, wherein the abrasive component consists substantially exclusively of said abrasive particles.

12. A method for preparing the abrasive coated particle of claim 1, which comprises spraying the particle with a slurry containing said borate glass to form, upon evaporation, a thin inner coating layer of the glass, ceramic or mixture thereof on the CBN surface, optionally, sintering and heating the coated particle to cause a reaction between the reactive glass coating and the CBN and, subsequently, spraying the coated particle with a vitreous material to form an outer coating layer.

13. The method of claim 12, wherein the particle is levitated in a stream of warm air while being sprayed with the inner coating layer and outer coating layer slurries.

14. The method of claim 12, wherein the particle is maintained in a fluidized bed while being sprayed with the inner coating layer and outer coating layer slurries.

15. An abrasive coated particle comprising a cubic boron nitride particle coated with a thin layer formed by the chemical reaction of the cubic boron nitride with a borate glass.

16. The abrasive coated particle of claim 15, wherein a graded seal is formed in the coated particle.

17. The abrasive coated particle of claim 15, wherein the thin layer is formed in an amount sufficient to prevent bloating caused by the generation of gases during sintering or use of the particle.

18. The abrasive coated particle of claim 15, wherein the thin layer has a thickness of up to 10 microns.

19. The abrasive coated particle of claim 15, wherein the thin layer has a thickness of from 5 to 10 microns.

* * * * *